(12) United States Patent
Scott et al.

(10) Patent No.: US 9,881,425 B1
(45) Date of Patent: Jan. 30, 2018

(54) SYNCHRONIZED SIDE-BY-SIDE DISPLAY OF REAL AND VIRTUAL ENVIRONMENTS

(71) Applicant: The Boeing Company, Chicago, IL (US)

(72) Inventors: Jeremiah K. Scott, Kirkland, WA (US); James J. Troy, Issaquah, WA (US); Katherine I. Meza, Lynnwood, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/261,099

(22) Filed: Sep. 9, 2016

(51) Int. Cl.
| | | |
|---|---|---|
| *G06T 17/00* | (2006.01) | |
| *G06T 19/00* | (2011.01) | |
| *G06T 15/00* | (2011.01) | |
| *G06T 1/60* | (2006.01) | |
| *B64F 5/00* | (2017.01) | |

(52) U.S. Cl.
CPC .......... *G06T 19/006* (2013.01); *B64F 5/0009* (2013.01); *G06T 1/60* (2013.01); *G06T 15/005* (2013.01)

(58) Field of Classification Search
None
See application file for complete search history.

(56) References Cited

U.S. PATENT DOCUMENTS

| | | | |
|---|---|---|---|
| 7,365,747 B2 | 4/2008 | Finlayson et al. | |
| 7,436,429 B2 | 10/2008 | Tillotson | |
| 8,315,425 B2 * | 11/2012 | Appel | G06T 7/0004 382/100 |
| 8,346,020 B2 | 1/2013 | Guntur | |
| 9,177,085 B2 | 11/2015 | Snyder et al. | |
| 9,292,180 B2 | 3/2016 | Gass et al. | |
| 2001/0025229 A1 * | 9/2001 | Moritz | G06T 17/00 703/1 |
| 2002/0093541 A1 * | 7/2002 | Schileru-Key | G06F 3/04815 715/855 |
| 2009/0292175 A1 * | 11/2009 | Akimoto | A61B 1/2676 600/156 |
| 2011/0164163 A1 * | 7/2011 | Bilbrey | G06F 1/1694 348/333.01 |
| 2011/0279697 A1 * | 11/2011 | Shingu | G06T 19/006 348/222.1 |
| 2012/0099804 A1 * | 4/2012 | Aguilera | G06F 17/30873 382/285 |
| 2012/0116728 A1 * | 5/2012 | Shear | G06F 17/50 703/1 |

(Continued)

*Primary Examiner* — Barry Drennan
*Assistant Examiner* — Jason Pringle-Parker
(74) *Attorney, Agent, or Firm* — Ostrager Chong Flaherty & Broitman P.C.

(57) ABSTRACT

Systems and methods that enable the synchronized display of both "as-built" and "as-designed" representations and automated data updates of a target object of interest (e.g., specific line number aircraft). More specifically, the process allows users to display a panoramic image captured for a reference environment, and then display a visualization of the corresponding 3-D model at the same viewpoint. Inter-process communication between a panoramic image viewer application and a 3-D model visualization application provides the ability to synchronize viewpoints, fields-of-view and other display features.

21 Claims, 9 Drawing Sheets

(56) References Cited

U.S. PATENT DOCUMENTS

2012/0249588 A1* 10/2012 Tison .................... G06F 1/1696
                                                    345/633
2012/0304105 A1    11/2012 Rosman Lafever et al.
2014/0245206 A1     8/2014 Senesac
2014/0298216 A1    10/2014 Prazak et al.
2015/0063627 A1*   3/2015 Mohammad ............ G06T 7/001
                                                    382/103

* cited by examiner

SYNCHRONIZED SIDE-BY-SIDE DISPLAY OF REAL AND VIRTUAL ENVIRONMENTS

BACKGROUND

This disclosure generally relates to the display of synchronized side-by-side viewing of photographic and computer-generated images of complex objects such as aircraft during design, assembly or maintenance.

When building or maintaining a complex object like an aircraft, it is useful to have access to photographic imagery (e.g., panoramic images) showing the assembled or partially assembled object. But this "as-built" representation takes time to acquire and may not be available for all instances of the target object (especially instances that are not built yet).

As used herein, the term "3-D model" means a 3-D computer-aided design (CAD) or other similar model (sometimes referred to as a solid model). A three-dimensional (3-D) model visualization system may be used to display images representing portions and/or individual components of one or more 3-D models of a complex object within a graphical user interface. Visualization systems may be used to perform various operations with respect to the image of the object. For example, a user may use a 3-D model visualization system to navigate to an image of a particular part or assembly of parts within an object for the purpose of identifying information for use in performing an inspection or a repair. Visualization of 3-D models can provide an "as-designed" representation of the target object or environment and can be created before the target object exists, but changes or updates that occur during assembly might not be available in this representation of the target object.

In the aviation industry, users who need visual information about an aircraft typically walk to the aircraft to see how some portion of the aircraft was assembled or try to determine information from two-dimensional (2-D) drawings. Three-dimensional model visualization systems are also available, but do not include photorealistic representations of the scene.

Existing photographic image-based viewer applications, such as "virtual tour" applications that use spherical panoramic images and spherical image viewers, improved this situation by allowing users to view real-world panoramic images of a previous version of the aircraft from multiple angles on a personal computer (PC), laptop, or tablet—but they could not display the current version of the aircraft. Here we will be using the words "panoramic image" and "panoramic image viewer application" to represent the class of photographic image-based viewer applications that use one or more curvilinear or stitched rectilinear photographic images to provide a 360-degree representation of the target environment, a portion of which will be shown to the user in the form of a transformed rectilinear image in the image viewer application. In addition, an existing 3-D visualization application also allows users to see models of the nominal designs for specific line number aircraft in context, but the images generated by the 3-D visualization are not photorealistic and may miss some of the subtle features of the actual aircraft.

While existing virtual tour types of applications provide as-built visual data, that data is captured for a specific line number aircraft, which may not be exactly how subsequent (or prior) aircraft look. Also, parts could not be removed from the digital photographs to show what is behind them. In contrast, the existing 3-D visualization application has the ability to show 3-D data for each specific line number aircraft, but cannot show the as-built environment, which also has a visual difference (since the images rendered in the 3-D visualization are non-photorealistic).

It would be desirable to provide an application that addresses the shortcomings of each of the above-described approaches by providing a method for combined use of data from physical (i.e., photographic) images and 3-D models.

SUMMARY

The subject matter disclosed in detail below is directed to systems and methods that enable the display of both "as-built" and "as-designed" representations and automated data updates of a target object of interest (e.g., specific line number aircrafts). More specifically, the process allows users to display a panoramic image captured for a reference environment, and then display a visualization of the corresponding 3-D model at the same viewpoint. Interprocess communication between a panoramic image viewer application and a 3-D model visualization application provides the ability to synchronize viewpoints, fields-of-view and other display features. This concept is implemented using an application programming interface (API) incorporated in the 3-D model visualization application. It enables communications and data sharing between an image-based viewer application and a 3-D model visualization application. In at least some embodiments, the interprocess communication is configured to enable the synchronization of views for side-by-side display.

The embodiments of an application described herein address the respective shortcomings of the panoramic imaging and 3-D model visualization approaches by providing a method for combined use of data from physical (i.e., photographic) images and 3-D CAD models. The process allows users to view panoramic images captured for the reference target, and then view the corresponding 3-D CAD models at the same viewpoint for the specific target object of interest. One of the specific problems addressed herein is the synchronization of viewpoints between two applications that have different internal representations. This is solved by using viewpoint alignment, conversion, and interprocess communication between the applications.

As used herein, the term "viewpoint" is the apparent distance and direction from which a camera views and records an object. A visualization system allows a user to view an image of an object from a viewpoint that can be characterized as the apparent location of a virtual camera. As used herein, the term "location" includes both position (e.g., a look-from position having x,y,z coordinates) and orientation (e.g., a look direction vector along a virtual line-of-sight, the endpoints of the look direction vector being the aforementioned look-from position and a look-at point).

In accordance with some embodiments, the panoramic image viewer application comprises a panoramic image display process, a viewpoint representation conversion process, and a client request process. The panoramic image display process is configured to retrieve a panoramic photograph dataset representing a panoramic image of a particular reference aircraft in response to a panoramic image selection by a user and then display a portion of the panoramic image a user-selected viewpoint in response to a viewpoint selection by the user. The viewpoint representation conversion process is configured to convert an internal representation of the user-selected viewpoint to a viewpoint representation formatted for three-dimensional model visualization. The client request process is configured to construct a command data string containing encoded data specifying parameter values of the viewpoint representation formatted for 3-D model visualization. The client request process sends a hypertext transfer protocol (HTTP) communication containing that command data string via a transmission control protocol (TCP) connection to an external application programming interface (API) defined in a 3-D model visualization application as part of a server response process. The HTTP communication contains virtual camera position and orientation data (the data may also include a field-of-view angle) specifying the viewpoint selected by the user in a format required by the 3-D model visualization application. Upon receiving the HTTP communication containing the selected viewpoint information, the external API outputs that viewpoint information in accordance with a non-HTTP protocol to an internal API incorporated in the 3-D model visualization application. The 3-D model visualization process is configured to display a visualization of a corresponding 3-D model of a current production aircraft in a second window with the viewpoint specified in the command data string.

As used herein, the term "current production aircraft" means an aircraft still in the process of being assembled. As used herein, the term "reference aircraft" means an aircraft that is at a different stage of production than the current production aircraft. This different stage of production may be that the reference aircraft has been fully assembled.

One aspect of the subject matter disclosed in more detail below is a system for synchronized display of panoramic images and visualizations of 3-D models for use in assembly of aircraft, comprising: a non-transitory tangible computer-readable storage medium storing panoramic photograph datasets representing panoramic images for a plurality of reference aircraft and 3-D model datasets which can be rendered to visualize 3-D models for a plurality of current production aircraft that each include design modifications not incorporated in at least one of the plurality of reference aircraft; a display system comprising a multiplicity of pixels; a user interface for converting inputs by a user into electrical signals representing selection inputs; a panoramic image viewer application comprising a panoramic image display process, a viewpoint representation conversion process and a client request process; and a 3-D model visualization application comprising a 3-D model visualization process and a server response process. The panoramic image display process is configured to retrieve a panoramic photograph dataset representing a panoramic image of a particular reference aircraft from the non-transitory tangible computer-readable storage medium in response to a panoramic image selection input received from the user interface and then control the display system to display a portion of the panoramic image with a user-selected viewpoint in response to a viewpoint selection input received from the user interface. The viewpoint representation conversion process is configured to convert an internal representation of the user-selected viewpoint to a viewpoint representation having a format acceptable to the 3-D model visualization process. The 3-D model visualization process is configured to retrieve a 3-D model dataset corresponding to a particular current production aircraft from the non-transitory tangible computer-readable storage medium in response to a 3-D model selection input received from the user interface. The client request process is configured to construct and transmit a command data string containing encoded data specifying parameter values of the viewpoint representation formatted for 3-D model visualization. The server response process is configured to receive and decode the command data string into specified parameter values of a viewpoint for 3-D model visualization. The 3-D model visualization process is further configured to control the display system to display a portion of a 3-D model visualization represented by the retrieved 3-D model dataset in a second window with the viewpoint specified in the command data string in response to receipt of the specified parameter values from the server response process. In accordance with some embodiments, the panoramic image in the first window and the 3-D model visualization in the second window are used during assembly of the particular current production aircraft. In accordance with one embodiment, the multiplicity of pixels are arranged to form a display screen, and the first and second windows appear side by side on the display screen. Typically the 3-D model visualization in the second window shows an aircraft that may be different in some ways than in the panoramic image in the first window.

Another aspect of the subject matter disclosed in detail below is a method for synchronized display of panoramic images and 3-D model visualizations for use in assembly of aircraft, comprising: selecting a particular reference aircraft; retrieving a panoramic photograph dataset for the selected reference aircraft; displaying at least a portion of a panoramic image represented by the panoramic photograph dataset for the selected reference aircraft; selecting a particular current production aircraft that may have a design modification not incorporated in the selected reference aircraft; retrieving a 3-D model dataset for the selected current production aircraft; displaying a first viewpoint of a visualization of a 3-D model for the selected current production aircraft; selecting a viewpoint for the panoramic image, the selected viewpoint comprising first viewpoint parameter values; displaying at least a portion of the panoramic image represented by the panoramic photograph dataset for the selected reference aircraft with the selected viewpoint; computing a second viewpoint for a second visualization of the 3-D model based on the selected viewpoint for the panoramic image, the second viewpoint comprising second viewpoint parameter values which are different than the first viewpoint parameter values; and displaying the second viewpoint of the visualization of the 3-D model for the selected current production aircraft, wherein the selected panoramic image viewer application viewpoint and the second viewpoint are the same, and wherein the design modification is displayed for use in assembly of the current production aircraft.

A further aspect of the subject matter disclosed in detail below is a method for synchronized display of panoramic images and 3-D model visualizations for use in assembly of aircraft, comprising: retrieving a panoramic photograph dataset representing a panoramic image of a particular reference aircraft from a non-transitory tangible computer-readable storage medium in response to a panoramic image selection input received from a user interface; displaying a portion of the panoramic image with a user-selected viewpoint in response to a viewpoint selection input received from the user interface; converting an internal representation of the user-selected viewpoint to a viewpoint representation having a format acceptable to a 3-D model visualization process of a 3-D model visualization application; retrieving a 3-D model dataset corresponding to a particular current production aircraft from the non-transitory tangible computer-readable storage medium in response to a 3-D model selection input received from the user interface; constructing a command data string containing encoded data specifying parameter values of the viewpoint representation formatted for 3-D model visualization; transmitting the command data string to the 3-D model visualization application; decoding the transmitted command data string into specified parameter values of a viewpoint for 3-D model visualization; and displaying a portion of a 3-D model visualization represented by the retrieved 3-D model dataset in a second window with the viewpoint specified in the command data string in response to receipt of the specified parameter values.

Yet another aspect is a system comprising a display system, one or more processors, a user interface for converting inputs by a user into electrical signals representing selection inputs, and a non-transitory tangible computer-readable storage medium containing first executable code for executing a panoramic image viewer application, second executable code for executing a 3-D visualization application, stored panoramic photograph datasets representing panoramic images of an object, and stored 3-D model datasets representing 3-D models of the object but with a design modification. The one or more processors are configured to be capable of performing the following operations: retrieving a panoramic photograph dataset representing a panoramic image of a particular reference aircraft from the non-transitory tangible computer-readable storage medium in response to a panoramic image selection input received from the user interface; controlling the display system to display a portion of the panoramic image with a user-selected viewpoint in response to a viewpoint selection input received from the user interface; converting an internal representation of the user-selected viewpoint to a viewpoint representation having a format acceptable to the 3-D model visualization application; retrieving a 3-D model dataset corresponding to a particular current production aircraft from the non-transitory tangible computer-readable storage medium in response to a 3-D model selection input received from the user interface; constructing a command data string containing encoded data specifying parameter values of the viewpoint representation formatted for 3-D model visualization; transmitting the command data string from the panoramic image viewer application to the 3-D model visualization application; decoding the transmitted command data string into specified parameter values of a viewpoint for 3-D model visualization; and controlling the display system to display a portion of a 3-D model visualization represented by the retrieved 3-D model dataset in a second window with the viewpoint specified in the command data string in response to receipt of the specified parameter values.

In accordance with some embodiments, the user is also able to move the mouse to the 3-D visualization application window and adjust the 3-D environment viewpoint of the 3-D CAD model visualization. Then in response, the viewpoint of the display of the panoramic image shown in the panoramic image viewer application window is changed by the automated synchronization process to match the 3-D environment viewpoint.

Other aspects of systems and methods for synchronized display of panoramic images and 3-D model visualizations at the same viewpoint are disclosed below.

BRIEF DESCRIPTION OF THE DRAWINGS

The features, functions and advantages discussed in the preceding section can be achieved independently in various embodiments or may be combined in yet other embodiments. Various embodiments will be hereinafter described with reference to drawings for the purpose of illustrating the above-described and other aspects.

Reference will hereinafter be made to the drawings in which similar elements in different drawings bear the same reference numerals.

DETAILED DESCRIPTION

Illustrative embodiments of systems and methods for synchronized display of panoramic images and 3-D model visualizations of a target object of interest or portions thereof are described in some detail below. However, not all features of an actual implementation are described in this specification. A person skilled in the art will appreciate that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

For the purpose of illustration, systems and methods for the synchronized side-by-side display of panoramic images and 3-D CAD model visualizations of an aircraft or parts thereof will be described in detail below. However, the concept disclosed herein can also be used to enable the synchronized side-by-side display of panoramic images and 3-D CAD model visualizations of complex structures other than aircraft. More specifically, the systems and methods disclosed herein have potential for use within the aerospace industry, as well as in other industries involving complex 3-D environments, such as architecture and shipbuilding.

Figure 1:
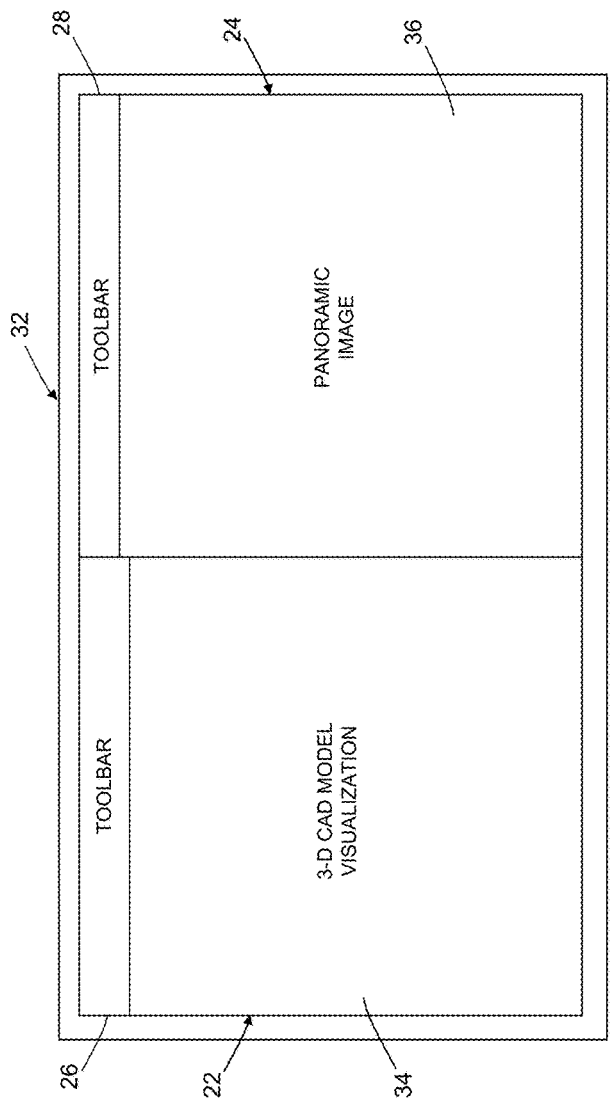
FIG. 1 is a diagram showing a display screen with two windows, one window for display of a panoramic image and another window for display of a visualization of a 3-D model.

FIG. 1 shows a display screen 32 with two windows, one window 22 for displaying a first toolbar 26 and a 3-D CAD model visualization 34 of a 3-D model of an object or portion thereof and another window 24 for displaying a second toolbar 28 and a panoramic image 36 of the object or portion thereof. The second toolbar 28 may be used to select the panoramic image 36 from a set of predefined panoramic images, each of which has a corresponding position where the camera was placed in the target environment. In alternate embodiments, an overview map (not shown) with selectable locations may be used to specify the desired panoramic image 36. Using the second toolbar 28 (or overview map), the user starts the process by making a selection of a desired position in the target environment from a representation of possible positions where panoramic images have been captured. The panoramic image for that selected position is then loaded into the application (i.e., the panoramic image viewer). The user can then change the viewpoint in the panoramic image viewer to display a region of interest, i.e., the user can change the viewing region of the selected panoramic image 36 in order to obtain a desired viewpoint. An algorithm in the panoramic image viewer then computes the selected viewpoint in the proper form needed for the 3-D model visualization application, and then sends that data to the 3-D model visualization application. In response to receipt of such communication, a corresponding 3-D CAD model visualization 34 having a viewpoint that matches the viewpoint in the panoramic image viewer will be displayed in window 22. If the user then moves the cursor into window 22, the user can cause the first selected viewpoint of the 3-D visualization to change using pan, tilt and zoom functions. By returning the cursor to window 24, the user can then select a panoramic image 36 having a different viewpoint. In response to that selection, a corresponding 3-D CAD model visualization 34 having a second selected viewpoint that matches the different viewpoint in the panoramic image viewer will be displayed in window 22. If the user moves the cursor back into window 22, the user can move the cursor over the 3-D model visualization to perform tasks like selecting objects to find part numbers.

In alternative embodiments, the user is able to move the mouse to the 3-D visualization application window 22 and adjust the 3-D environment viewpoint of the 3-D CAD model visualization 34. Then in response, the viewpoint of the display of the panoramic image 36 shown in the panoramic image viewer application window 24 is changed by the automated synchronization process to match the 3-D environment viewpoint.

Figure 2:
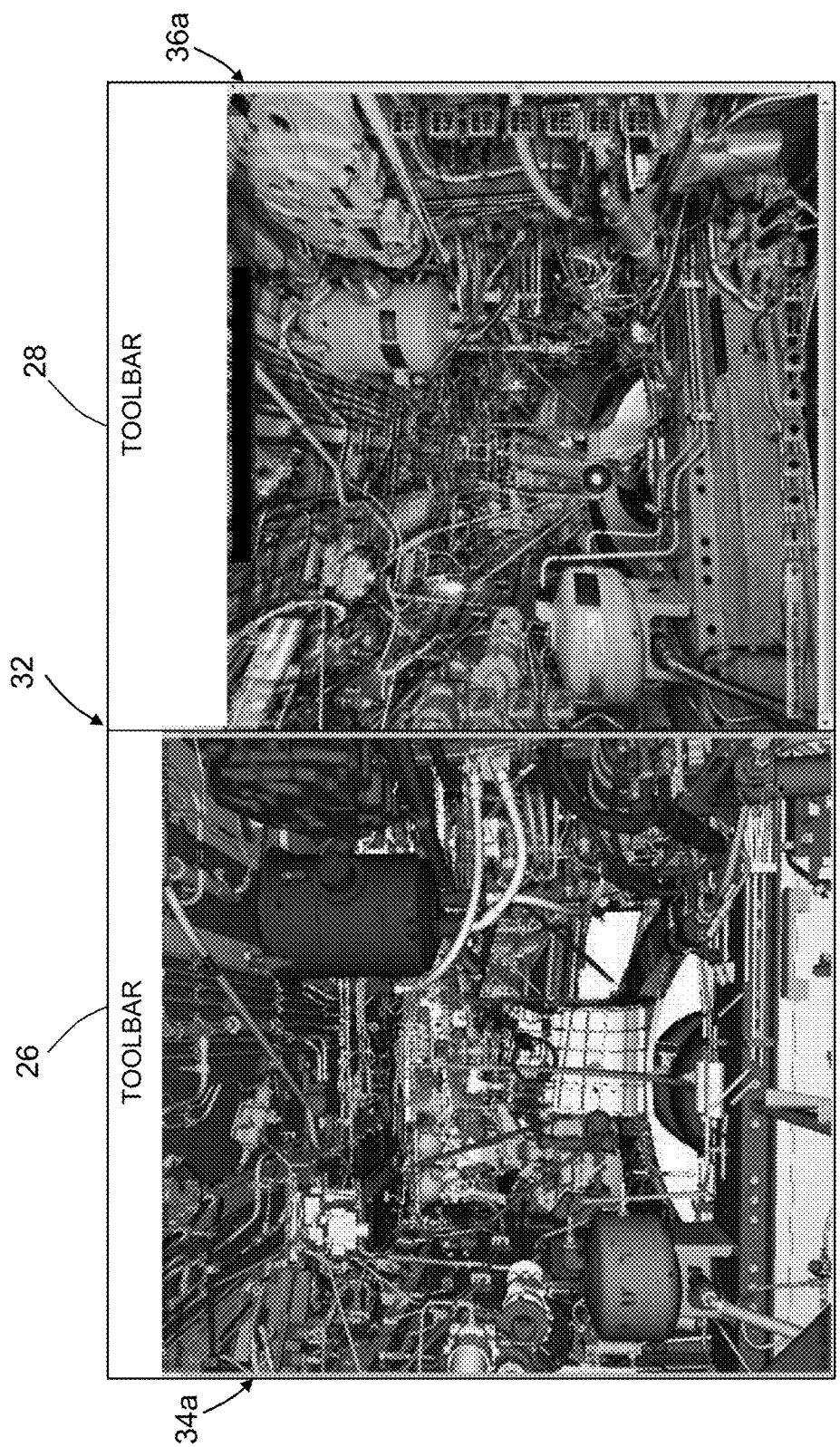
FIG. 2 is a diagram showing one example of a panoramic image and a 3-D CAD model visualization having the same viewpoint being concurrently displayed in respective windows on a display screen in a synchronized side-by-side configuration.
Figure 3:
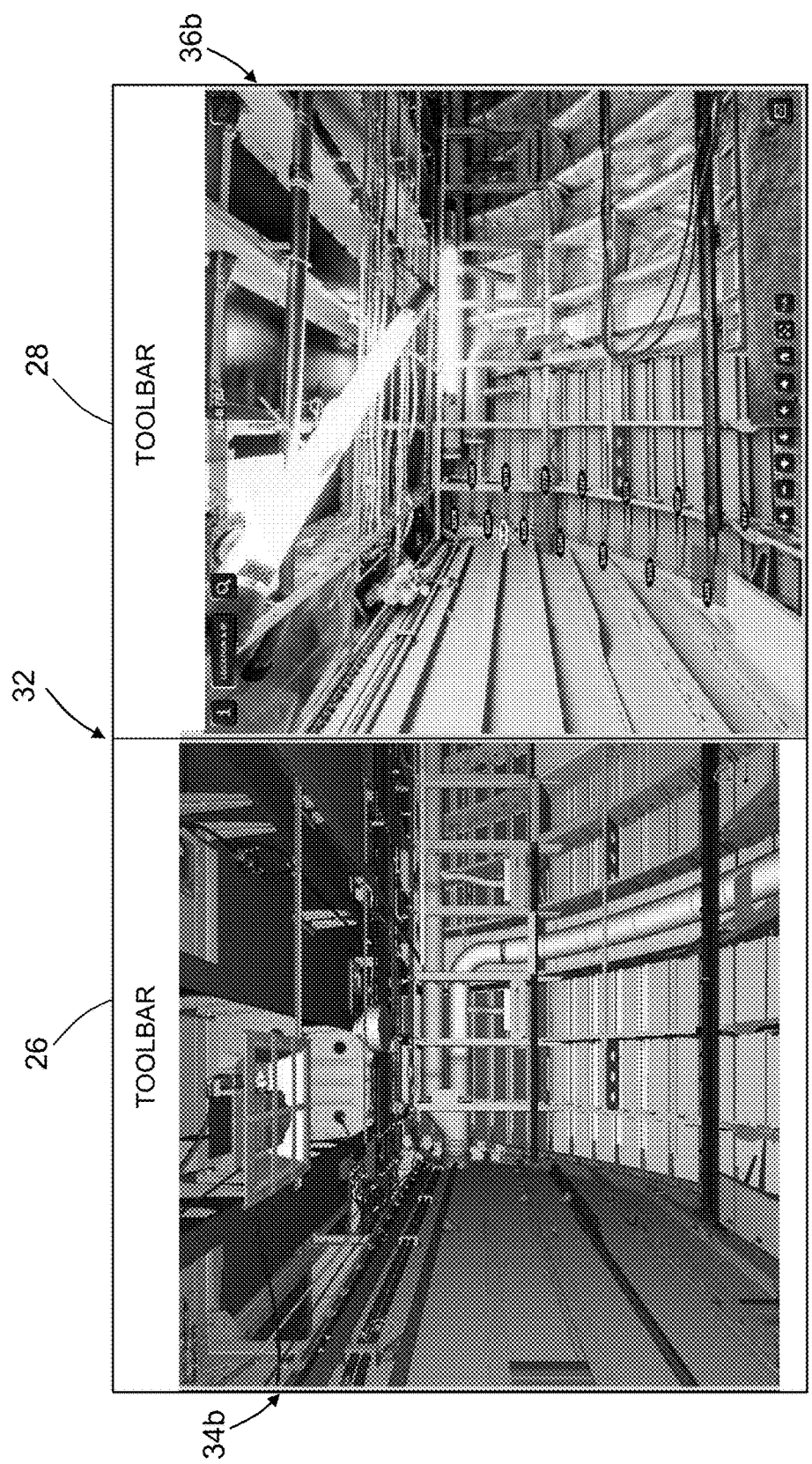
FIG. 3 is a diagram showing another example of a panoramic image and a 3-D CAD model visualization having the same viewpoint being concurrently displayed in respective windows on a display screen in a synchronized side-by-side configuration.

Two examples of side-by-side display of a 3-D CAD model visualization and a panoramic image on a display screen are shown in FIGS. 2 and 3 in the context of an aircraft in production. FIG. 2 shows a panoramic image 36a and a 3-D CAD model visualization 34a of a wheel well area for the main landing gear of an aircraft concurrently displayed in respective windows on a display screen 32 in a synchronized side-by-side configuration. The panoramic image 36a and 3-D CAD model visualization 34a have the same viewpoint. FIG. 3 shows a panoramic image 36b and a 3-D CAD model visualization 34b of a part of a cargo bay area of an aircraft concurrently displayed in respective windows on a display screen 32 in a synchronized side-by-side configuration. The panoramic image 36b and 3-D CAD model visualization 34b have the same viewpoint.

An on-site application for side-by-side display is where the user is holding a tablet PC or other portable computing device in the same location as the target (such as next to or inside an aircraft). In this situation, both the 3-D visualization application and panoramic image viewer application would usually be running on the same device (e.g., a lightweight device like a tablet).

In accordance with alternative embodiments, the windows that respectively display a panoramic image and a 3-D model visualization can appear on separate display screens of respective display devices that form a display system. These display devices can be placed side by side at a site where a current production aircraft is being produced, where the current production aircraft requires a design modification that is not included in a previously produced reference aircraft.

The systems and methods disclosed herein allow users to view panoramic images captured for a reference target, and then see the corresponding 3-D models in alignment at the same viewpoint for the specific target object of interest. For example, if the target object were an aircraft and the reference images were captured for the initial aircraft (production line number 1), but custom modifications were made for a later production line number aircraft, the systems and methods disclosed herein enable a user to see the captured images for an aircraft that looks very similar to the current aircraft, but then show another view (3-D model) for the specific aircraft in question that includes the design modifications for the current production line number aircraft, whereby modifications are displayed for use in assembly of the current production aircraft.

The concept disclosed herein combines panoramic image display and 3-D model visualization to deliver both "as-built" and "as-designed" representations and automated data updates for a target object of interest (e.g., specific line number aircrafts). More specifically, the process allows users to display a panoramic image captured for a reference environment, and then display a visualization of the corresponding 3-D model at the same viewpoint. Interprocess communication between a panoramic image viewer application and a 3-D model visualization application provides the ability to synchronize viewpoints, fields-of-view and other display features.

Figure 4:
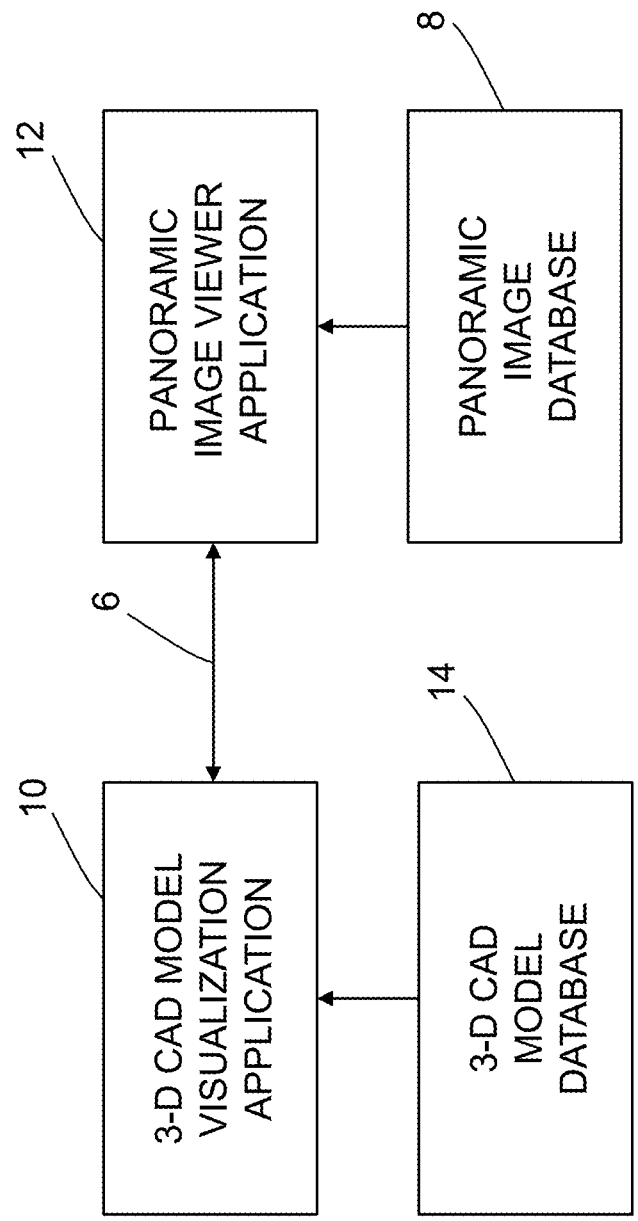
FIG. 4 is a block diagram showing an architecture in which a panoramic image viewer application and a 3-D CAD model visualization application communicate for the purpose of selecting the viewpoint of the 3-D visualization.

FIG. 4 shows an architecture in which a panoramic image viewer application 12 and a 3-D CAD model visualization application 10 communicate via a TCP connection 6 using HTTP for the purpose of enabling a user to select the viewpoint of the 3-D visualization of at least a portion of a 3-D CAD model of an aircraft or other object. More specifically, the 3-D CAD model visualization application 10 and the panoramic image viewer application 12 communicate for the purpose of selecting a viewpoint of the 3-D visualization that matches the viewpoint of the displayed panoramic image. Data representing panoramic images is stored in a panoramic image database 8. Selected panoramic image data can be retrieved by the panoramic image viewer application 12 and then a panoramic image is displayed. Similarly, data representing 3-D CAD models is stored in a 3-D CAD model database 14. Selected 3-D CAD model data can be retrieved by the 3-D CAD model visualization application 10 and rendered into a corresponding 3-D CAD model visualization in display format. The panoramic image database 8 and 3-D CAD model database 14 each comprise datasets stored in a non-transitory tangible computer-readable storage medium. The 3-D visualization process of the 3-D model visualization application 12 provides a graphical representation of aircraft components in their physical form.

In some embodiments, the dataset for a particular panoramic image stored in the panoramic image database 8 can be acquired by setting up a camera on a tripod at a specified position inside a fuselage of an aircraft, rotating the camera about a middle point of the lens so that its line-of-sight is at a first angle, capturing an image while the camera is oriented at the first angle, rotating the camera about the middle point of the lens so that its line-of-sight is at a second angle which differs from the first angle by a specified angle of rotation and its field-of-view (which may be measured in terms of the number of degrees or radians of a solid angle) overlaps the field-of-view when the camera was at the first angle, capturing an image while the camera is oriented at the second angle, and so forth. The process of rotating the camera through a specified angle of rotation and then capturing a respective image is repeated until enough images have been captured to enable those images to be stitched together in a well-known manner to form a dataset representing a 360° panoramic image. Alternatively, images captured by multiple cameras having overlapping fields-of-view can be stitched together.

In accordance with some embodiments, the panoramic image viewer application 12 is configured to use spherical panoramic images, also known as equirectangular images (typically with a 2:1 aspect ratio). This is a single curvilinear image that is distorted at the top and bottom of the image, but appears rectilinear when mapped to a sphere. An example of this type of application is the "Virtual Tour" viewer. Another type of panoramic image viewer application may use a series of rectilinear images that are mapped to multiple flat surfaces, such as the faces of a cube. An example of this type of cubic viewer is QuickTime VR (QTVR). Other types of panoramic image viewer applications may use cylindrical mapping or long images that have been captured by a camera (like a slit-scan camera) moving in a linear manner past the target environment.

In accordance with some embodiments, the method for synchronized display involves a panoramic image viewer application 12 that incorporates a client request process and a 3-D model visualization application 10 that incorporates a server response process. These applications may run on processors in respective computer systems or on respective processors in one computer system. The client request process is configured to send an HTTP communication to the server response process. The HTTP communication includes a hypertext command message comprising a string of data specifying the position of a virtual camera, view direction, and the field-of-view angle.

In accordance with one exemplary implementation, the display control method comprises the following steps. First, the user initiates an HTTP-capable panoramic image display process (e.g., one that includes a client request process) and enters an address in the panoramic image database 8 where electronic files storing data representing panoramic images are stored. In response to entry of the address, a multiplicity of names or symbols identifying respective categories of panoramic images is displayed in a first window in the form of a list or a hierarchical tree structure. In response to selection of a category, a multiplicity of names or symbols identifying respective panoramic images belonging to the selected category is displayed in the first window. For example, a multiplicity of panoramic images corresponding to respective scenes of interior portions of a particular aircraft model (e.g., the categories are respective aircraft models) may be identified. In response to user selection of one of the names or symbols identifying one of the panoramic images, the panoramic image viewer process displays the selected panoramic image (or a portion thereof) of the object in the first window. The user can then manipulate the panoramic image until a desired viewpoint is obtained. Respective viewpoints of the panoramic image are associated with respective virtual camera locations of a 3-D model of the object.

In response to user selection of a panoramic image viewpoint, the viewpoint representation conversion process converts the internal representation of the user-selected viewpoint (e.g., the coordinate position, pan and tilt angles, and field-of-view of a camera) to a viewpoint representation having a format acceptable to the 3-D model visualization process (e.g., the coordinate position, look-at position and field-of-view of a virtual camera). The client request process then generates a command message in HTTP. The hypertext message comprises a string of data expressed in hypertext. The data in the string comprises first data specifying a position of a virtual camera associated with the panoramic image viewpoint and second data specifying an orientation of the virtual camera. Optionally, the data in the string may further comprise third data specifying a field-of-view of the virtual camera. The HTTP communication contains virtual camera position and orientation data specifying the viewpoint selected by the user and to be used by the 3-D model visualization process. The command message is then transferred via a TCP connection from the client request process of the panoramic image viewer application 12 to an external application programming interface (API) defined in the 3-D model visualization application 10 as part of a server response process.

Upon receiving the HTTP communication containing selected viewpoint information, the external API outputs that viewpoint information in accordance with a non-HTTP protocol to an internal API incorporated in the 3-D model visualization application 10. In response to receipt of the viewpoint information, the internal API instructs the 3-D visualization process to display a visualization of a 3-D CAD model of the object in a second window with a viewpoint characterized by the virtual camera location specified in the viewpoint information (which viewpoint is the same as the panoramic image viewpoint).

The process described above is enabled by an initial alignment step and then uses a run-time data conversion and interprocess communication between the panoramic image viewer application 12 and the 3-D CAD model visualization application 10 to synchronize the viewpoints and control other display functions. An easy-to-use graphics user interface provides control of the applications in a side-by-side configuration.

An initial alignment calibration process to align the panoramic image data within the coordinate system of the 3-D CAD model (e.g., the coordinate system of the 3-D CAD model of an aircraft) is required in order to synchronize the two types of data. This involves determination of offset values for translation (i.e., position) and rotation (i.e., orientation). It is possible to do this step manually by interactive iterative alignment of the camera used to acquire panoramic images with position markers incorporated in the target object (e.g., markers indicating station, water and butt lines inside a fuselage of an aircraft) or automatically using feature recognition. This process only needs to take place once per image, and the offsets can be applied to convert the coordinates of the panoramic imaging environment to the coordinate system of the 3-D model environment (or the reverse).

In order to provide matching viewpoints between the panoramic photo viewer application 12 and the 3-D CAD model visualization application 10, the viewing data as represented internally by the former must be converted to the form required by the latter, encoded for data transfer (e.g., using HTTP), transmitted (e.g., via a TCP connection), decoded, and then applied.

Looking at this from the panoramic image viewer application side first, a panoramic image in accordance with one embodiment may comprise 20,000 pixels horizontally and 10,000 pixels vertically and may be viewed using a two-axis input that controls the pan and tilt angles of a virtual camera. One approach to converting this data into a form that can be used by a 3-D visualization application is described next. The approach consists of converting the pan-tilt data into a look-from position, look-at point, and "up" vector format. The vector originating at the look-from position and terminating at the look-at point will be referred to herein as the "look direction vector". Alternatively, a 4×4 homogeneous transformation matrix and field-of-view could be used, or quaternions and field-of-view, as well as other formats.

The Cartesian look-from position (X,Y,Z) is calculated by adding the translation offset from the initial alignment calibration to the panoramic location. Orientation alignment may be performed by adding angle offsets to the view direction pan and tilt angles.

In most web-based systems, the client application makes a request to the server application, and the server responds to that request. But it is also possible to make the client operate so that it can react to changes that take place on the server. One way in which this can be accomplished is by sending status request commands from the client to the server at regular intervals. For example, the client may request an update status value from the server multiple times per second, and then respond when it gets the signal that something has changed. If the indication is that the update occurred to the viewpoint, the client may request that the current 3-D application viewpoint data be sent from the server to the client, and then react to that by computing the internal panoramic viewpoint representation from the 3-D application viewpoint data sent from the server. For this example, the client is responding to a change on the server, instead of the other way around (as described in previous examples). For this type of "reverse" viewpoint change, the internal panoramic viewer will need to calculate pan and tilt angles from the look-direction vector supplied from the 3-D application. This allows viewpoint synchronization between the client and server when the viewpoint on the server application changes.

In accordance with one aspect, the client request process of the panoramic image viewer application is configured to request an update status value from the server response process of the 3-D model visualization application and then respond when it receives a signal indicating that the three-dimensional model visualization viewpoint has changed by requesting that a representation of a current three-dimensional model visualization be sent by the server response process. A viewpoint representation conversion process is configured to convert the representation of the current three-dimensional model visualization received from the server response process to a viewpoint representation having specified parameter values in a format acceptable to the panoramic image display process. The panoramic image display process is configured to control the display system to display a portion of a panoramic image in a first window with a viewpoint corresponding to the current three-dimensional model visualization viewpoint in a second window in response to receipt of the specified parameter values from the viewpoint representation conversion process.

Alternate embodiments may use a communication protocol other than Hypertext Transfer Protocol (HTTP), such as Transport Control Protocol (TCP) or User Datagram Protocol (UDP) sockets. Both one-way and bidirectional communications may be supported by socket-based communications.

In cases wherein the client application makes a request to the server application, the pan angle (A) and tilt angle (B) are set to initial values of A=0 and B=0, which is the direction aligned with the X-axis of the target object. The equations for the coordinates of the look-at point are as follows:

$$Lx=R^*\cos(A)^*\cos(B)$$

$$Ly=R^*\sin(A)^*\cos(B)$$

$$Lz=R^*\sin(B)$$

where R is the desired range value (typically this is set to 1).

Lastly, the "up" vector is defined as:

$$UPx=-R^2^*\cos(A)^*\sin(B)$$

$$UPy=-R^2^*\sin(A)^*\sin(B)$$

$$UPz=R^2^*\cos(B)$$

In some embodiments the look direction vector and the up vector may need to be normalized (which is a well-known mathematical process) before being applied.

To convert back into pan-tilt angles from the 3-D visualization application to the panoramic image viewer application, the equations are as follows:

$$A=a\tan 2(Ly,Lx)$$

$$B=a\tan 2(Lz,\text{sqrt}(Lx^2+Ly^2))$$

where A is the pan angle and B is the tilt angle. This calculation is the type that would be needed for the "reverse" viewpoint change process described earlier, for situations in which it is desirable to maintain viewpoint synchronization when the viewpoint was changed in the 3-D visualization application and the viewpoint in the panoramic image viewer application needs to be updated.

Note that typically, the field-of-view (FOV) value is the same between the two applications. In some embodiments, a scale factor and/or offset may need to be applied to convert from the panoramic image viewer application field-of-view value to the form used for the 3-D visualization application field-of-view application.

Next, this data needs to be converted into a form that can be transmitted between the two applications over the interprocess communications connection. One approach to accomplishing this is to use HTTP.

In accordance with one advantageous implementation, the server response process incorporated in the 3-D model visualization application 10 incorporates an external API. Developers of the panoramic image viewer application 12 would then be able to create functions (such as setting a viewpoint) that will generate command data strings of data sent through the HTTP communication connection that comply with the 3-D application API format. The data in each HTTP command data string includes X,Y,Z position and an orientation (look direction vector and up vector) of a virtual camera. Data specifying the field-of-view of a virtual camera may also be included.

An example of an HTTP command data string that sets the viewpoint and FOV is as follows: http://localhost:12345/?Api=InProc.MoveCamera&cameraId=0&cx=10&cy=20&cz=100&lx=70&ly=0&lz=150&ux=0&uy=0&uz=1&Api=InProc.SetFov&cameraNum=0&fov=60&Api=InProc.Update
The position, look direction vector, up vector, and field-of-view values are embedded in this string, which are then decoded by the 3-D visualization application after receiving the data and then applied to set the viewpoint.

The command data strings sent via a TCP connection to the 3-D visualization application by the panoramic image viewer application contain the required data in the required format as defined in the 3-D visualization application's API specification. Such commands also conform to HTTP requirements for communication between a client application (e.g., a client request process in the panoramic image viewer application) and the server response process in the 3-D visualization application.

The external API incorporated in the server response process of the 3-D CAD model visualization application is exposed for use by external applications (such as the panoramic image viewer application). Once the data string is received by the external API processing function in the 3-D CAD model visualization application, it is processed internally by other non-external API functions to execute the desired capability (such as setting the virtual camera viewpoint command). These internal functions do not use HTTP to communicate with each other. HTTP is only used to get the data transferred between the two applications.

At the lowest level in the 3-D graphics processing, the camera viewpoint may be represented as a 4×4 homogeneous transformation matrix (most common) or any other available format. The command data string that was transferred to the 3-D CAD model visualization application 10 by way of HTTP is converted to the matrix form by internal functions within the 3-D visualization application. This is true for the camera viewpoint function. Other functions of the external API may send data that can be used without conversion.

The reference to "localhost" in the exemplary command data string given above is a standard way of referring to the Internet Protocol (IP) network address of a local computer. Alternatively, this field can be the IP address assigned to the computer. It can also be a name (like google.com) that can be resolved by Domain Name System (DNS). In general, this part of the command data string is used in order for the client (e.g., the panoramic image viewer application) to find the network location of the server (e.g., the 3-D visualization application). The term "localhost" can be used when both the client and server are running on the same computer, but when they are running on different computers, then one of the more explicit IP address forms will need to be used.

Still referring to the sample command data string given above, "InProc" is the name of a class of methods contained within the external API. In some implementations, other classes may be included in the external API. "InProc.MoveCamera" is the actual full name of the API method that sets the camera location. Another method is "InProc.SetFov", which can be used to set the field-of-view of the virtual camera. The "&cameraId=0" in the sample command data string refers to the specific identifier for camera number 0. The action for the command "Api=InProc.MoveCamera&cameraId=0" means that only camera 0 is being moved and not any of the other cameras.

The variables "cx=", "cy=" and "cz=" refer to the x, y, z coordinate position of the virtual camera (i.e., the look-from position) in the Cartesian space defined in the 3-D virtual environment. The variables "lx=", "ly=" and "lz=" are the values of the look direction vector that defines the direction in which the camera is pointed. The variables "ux=", "uy=" and "uz=" define the up vector, which is a vector that is orthogonal to the look direction vector (used to define the twist along look direction). All of the foregoing variables are used to define the camera location.

The particular syntax of the sample command data strings given above is specific to one implementation. The syntax does not have to appear in this exact form in other possible implementations.

As used herein, the phrase "process the update" refers to processing an update step in the implementation of an event-driven 3-D model visualization application. In this type of application (which is very common for graphical applications), the 3-D rendering only updates the image displayed on the screen when something changes in the environment, and the way in which the 3-D model visualization application processor determines that something has changed is to look for an action event. In a standard application where the processor is looking for inputs from the user, these events could be mouse movements, keyboard button presses, or events from other devices (such as a gamepad etc.). When any of these types of interactive inputs are processed, the operating system automatically creates an action event. In one embodiment of the 3-D model visualization application, the graphics update loop is looking for action events to trigger an update of the display, but in situations where changes are made to the state of the system without an interactive action event, which is what is happening with data coming from the external API, the 3-D model visualization application needs to be commanded to perform an update of the display. That is what the "InProc.Update" command does.

Figure 5:
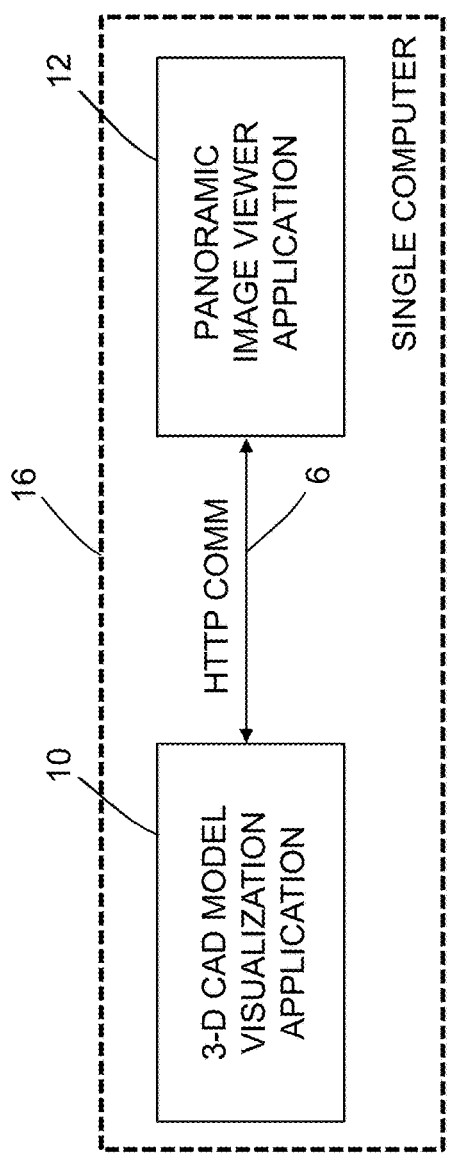
FIG. 5 is a block diagram showing one embodiment of the architecture shown in FIG. 4. In this embodiment, the panoramic image viewer application and the 3-D model visualization application run on a single computer having respective windows for displaying the panoramic image and the 3-D visualization.

In accordance with some embodiments, the 3-D CAD model visualization application 10 and the panoramic image viewer application 12 run on the same computer. FIG. 5 shows the 3-D CAD model visualization application 10 and panoramic image viewer application 12 running on a single computer 16 having a display interface with respective windows (not shown) for displaying the panoramic image and the 3-D visualization on the same screen. In this configuration, the HTTP communication is via a TCP connection 6.

Figure 6:
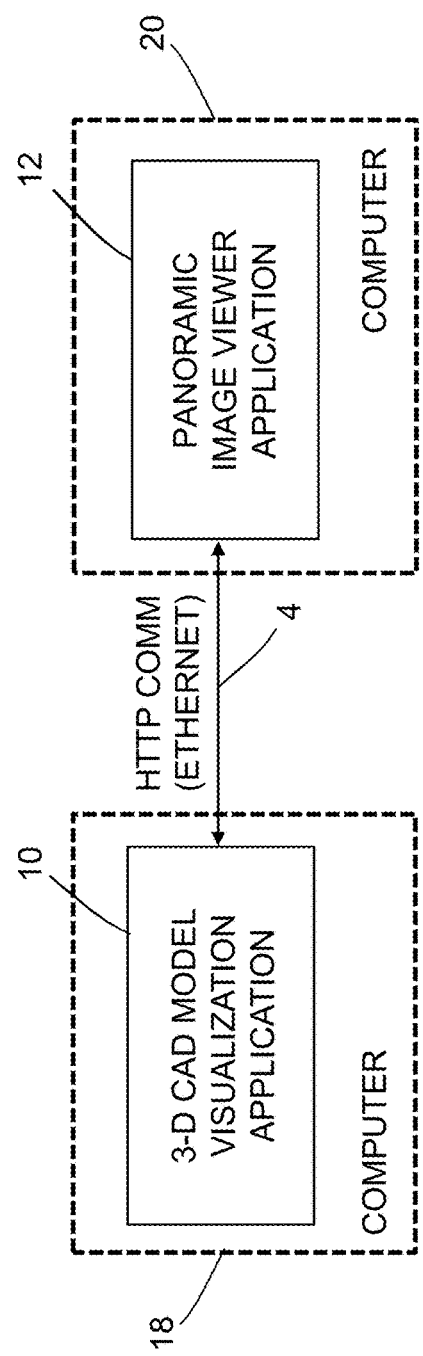
FIG. 6 is a block diagram showing another embodiment of the architecture shown in FIG. 4. In this embodiment, the panoramic image viewer application and the 3-D model visualization application run on separate computers which communicate via an Ethernet connection.

In accordance with other embodiments, the 3-D CAD model visualization application 10 and the panoramic image viewer application 12 run on different computers, which can be useful in cases where insufficient visualization resources are available on a single computer. FIG. 6 shows the 3-D CAD model visualization application 10 running on a first computer 18 and the panoramic image viewer application 12 running on a second computer 20. In this configuration, the HTTP communication is via an Ethernet connection 4. Each computer has a respective display interface. Computer 18 comprises a display interface having a window (not shown) for displaying the 3-D visualization, while computer 20 comprises a display interface having a window (not shown) for displaying the panoramic image.

The computer 20 may be generally configured to execute a panoramic image viewer application 12 configured to depict a selected portion of a panoramic image that is rendered by a process, such as spherical projection, in the panoramic viewer application to produce a rectilinear image for display to the user. The computer 18 may be generally configured to execute a 3-D CAD model visualization application 10 configured to render for display a digital 3-D model 14 of a structural product composed of a plurality of parts. The 3-D CAD model visualization application 10 may render the digital 3-D model 14 in accordance with a number of techniques, such as those employed by CAD viewers and other 3-D model visualization applications. These types of applications use a graphics application program interface (API), such as OpenGL or Direct3-D, to render sequences of images representing the 3-D models contained within a virtual environment. Some examples include virtual reality modeling language (VRML) viewers, X3-D viewers, Java 3-D viewers, Unity, Unreal Engine or the like.

In one example, the 3-D model may represent the structural product as a collection of "primitives" such as edges, faces, points (e.g., vertices) and the like, which may be arranged into polygons or other arithmetically-derived structures to represent the geometry of surfaces, volumes or parts of the respective structural product. The structural product may be defined by a "boundary" representation, or collection of polygons that demarcate the space occupied by the structural product, which may include sub-collections of polygons that demarcate spaces occupied by respective parts of the structural product. Each of these sub-collections of polygons may be referred to as a 3-D object that corresponds to part of the structural product in the 3-D model. For some structural products, the 3-D model may use hundreds of thousands, millions or even billions of polygons, which may be arranged in thousands of sub-collections of polygons (3-D objects) corresponding to several thousands of parts.

The 3-D model may include information that may indicate a design type of the aircraft model, such as a conceptual model, preliminary design, released design or the like. The 3-D model may include information (e.g., name, number, quantity, source, material, 3-D location, related parts) regarding the structural product and/or one or more of its parts. The 3-D model may further include a model-based definition of the structural product, product manufacturing information such as geometric dimensions and tolerances, material specifications, component lists, process specifications, inspection requirements or the like. Additionally or alternatively, for example, the 3-D model may include information specifying various assembly, inspection, maintenance and/or repair procedures, each of which may include one or more tasks involving user interaction with one or more parts of the structural product. In various examples, this additional information may be provided directly in the 3-D model or in metadata associated with the 3-D model.

The 3-D CAD model visualization application 10 is configured to render the digital 3-D model of the structural product in a scene in which the digital 3-D model (or portions thereof) is observed from a particular point of view (i.e., viewpoint) corresponding to a virtual camera location in the frame of reference of the aircraft. The 3-D CAD model visualization application 10 may open or otherwise initially render the 3-D model observed from a home virtual camera location (i.e., home viewpoint), such as a viewpoint in which the whole of the structural product is observed. The 3-D CAD model visualization application 10 may then receive user input (as disclosed hereinabove) to navigate the 3-D model through a number of different operations such as pan, tilt and/or zoom operations, which may move the viewpoint of the 3-D model from its home to another viewpoint. In this manner, the scene may be focused on a particular portion of the aircraft.

Information regarding the part may also be similarly acquired from the 3-D model or metadata associated with it. As mentioned above, this information may include, for example, the name and/or number of the part, the 3-D location (i.e., position and orientation) of the part, information specifying procedure(s) involving the part, and the like.

Figure 7:
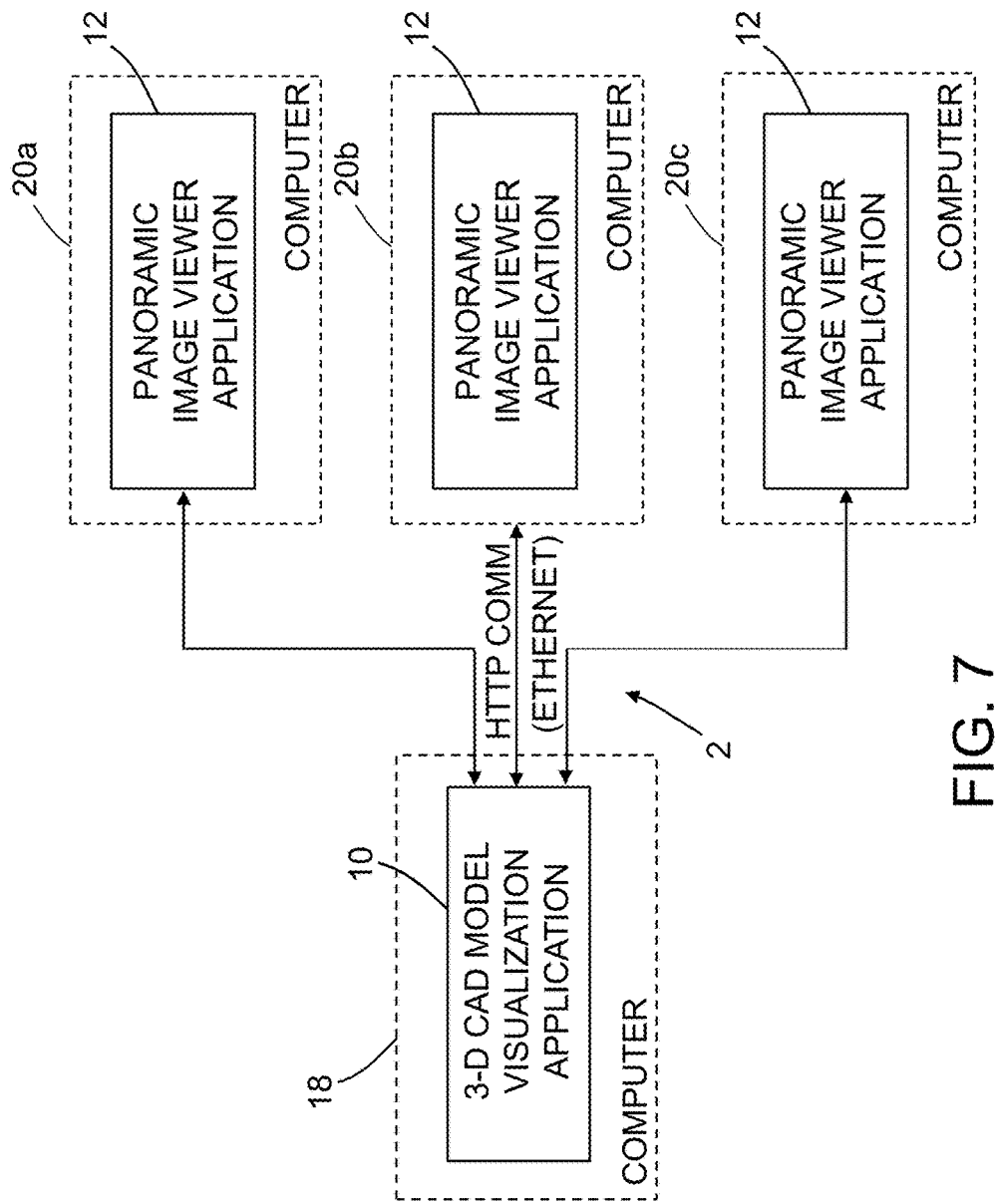
FIG. 7 is a block diagram showing an architecture in which multiple clients (in this example, multiple computers running respective panoramic image viewer applications) communicate with a server (in this example, a single computer running a 3-D model visualization application) via respective network connections, such as Ethernet connections.

In some cases it may be useful to have multiple instances of the panoramic image viewer application running simultaneously, each showing different views, but connected to the same instances of the 3-D visualization application, where each panoramic display takes turns updating the view in the 3-D visualization application. FIG. 7 is a block diagram showing an architecture in which a single computer 18 running a 3-D model visualization application 10 is able to communicate with a multiplicity of computers 20a-20c running respective panoramic image viewer applications 12 via respective Ethernet connections 4. In accordance with the architecture depicted in FIG. 7, a respective client request process incorporated in each panoramic image viewer application 12 may send command messages to a server which takes the form of a server response process incorporated in the 3-D model visualization application 10. The respective panoramic image viewer applications 12 are preferably different. For example, each panoramic image viewer application 12 may comprise a respective panoramic imaging process which is configured to display panoramic images of the components of a respective different aircraft representations in their physical form. For example, different panoramic images may show an aircraft at different stages of assembly. Computer 18 may communicate with computers 20a-20c via an Ethernet local area network 2. In alternative embodiments, the HTTP communications between the computers may be via the Internet.

Figure 8:
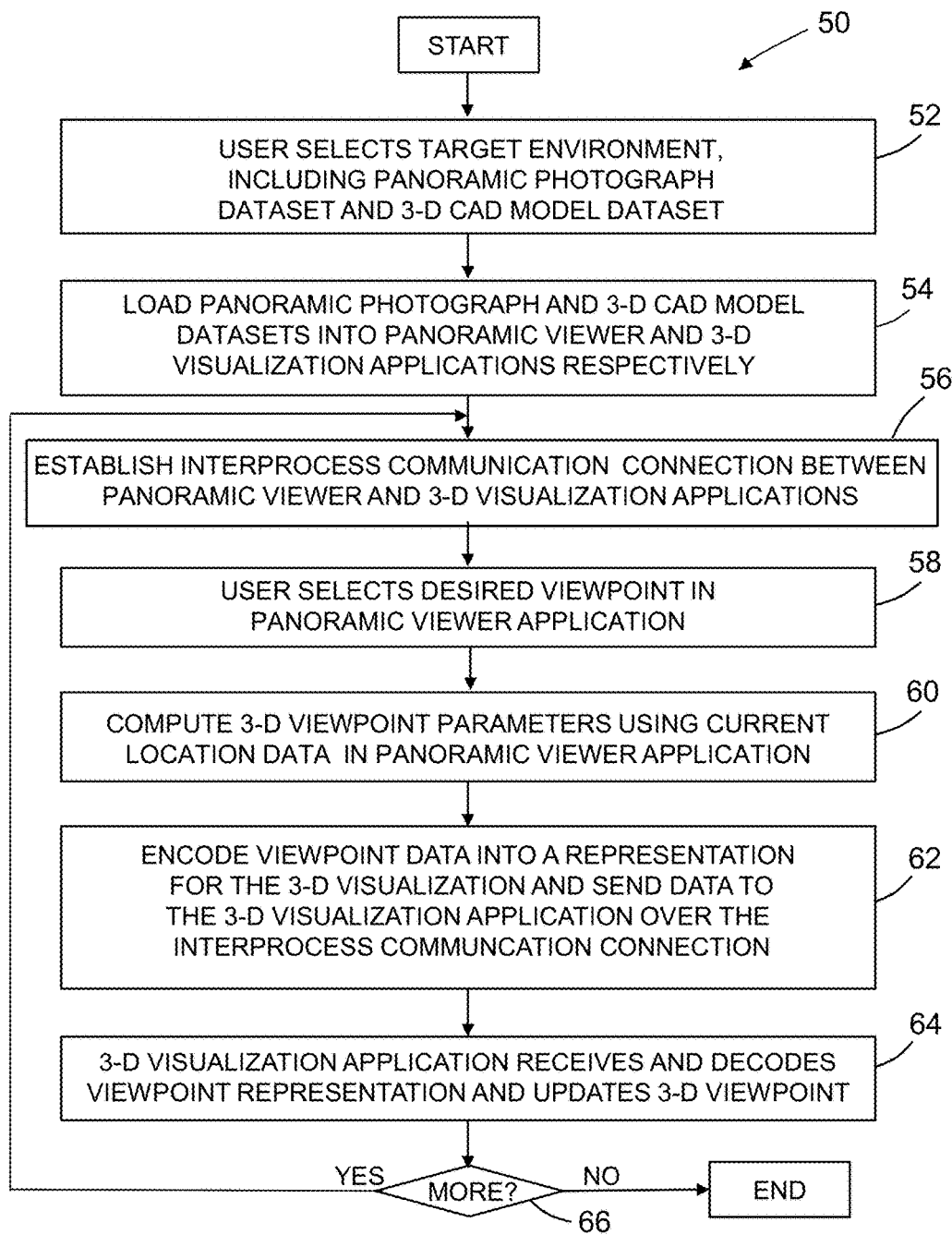
FIG. 8 is a flowchart identifying steps of a method for side-by-side display of a panoramic image and a 3-D model visualization of a complex object.

FIG. 8 is a flowchart identifying steps of a method 50 for side-by-side display of a panoramic image and a 3-D model visualization of a complex object in accordance with one embodiment. The method 50 starts with the user selecting a target environment (e.g. a complex object), which consists of a panoramic photographic dataset as well as a 3-D CAD model dataset (step 52) using respective graphical user interfaces displayed on the screen of a computer system. These data sets are retrieved from a non-transitory tangible computer-readable storage medium and then loaded into the panoramic image viewer application and the 3-D CAD model visualization application, respectively (step 54). An interprocess communication connection is established between the panoramic image viewer application and the 3-D CAD model visualization application (step 56). Using the panoramic imaging graphical user interface, the user selects the desired viewpoint in the panoramic image viewer application (step 58). The viewpoint representation conversion process of the panoramic image viewer application then computes the appropriate viewpoint parameter values for the 3-D CAD model visualization application from the current virtual camera location data associated with the panoramic image being displayed by the panoramic image viewer application (step 60). The client request process of the panoramic image viewer application then encodes that current virtual camera location data into a representation (such as a formatted command data string) appropriate for the external API of the 3-D CAD model visualization application and sends the command data string to the 3-D CAD model visualization application over the interprocess communication pathway (e.g., HTTP strings sent over a TCP connection) (step 62). Upon receiving the formatted command data string, the external API of the 3-D CAD model visualization application decodes the command data string into the viewpoint representation to be used by the 3-D CAD model visualization application and the 3-D viewpoint is updated (step 64). A determination is then made whether additional updates are desired or not (step 66). If additional updates are desired, then the process returns to step 56. If additional updates are not desired, then the process terminates.

Figure 9:
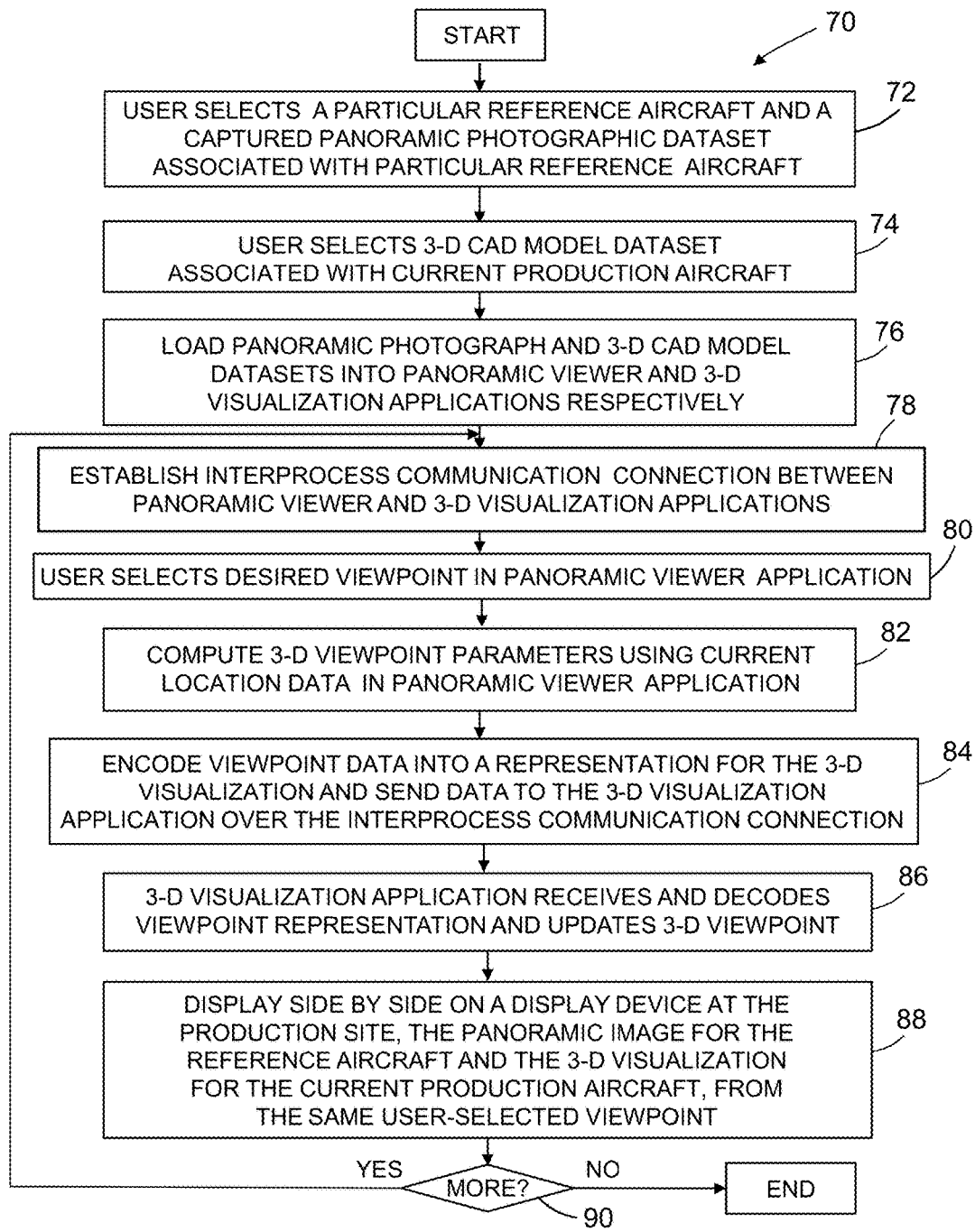
FIG. 9 is a flowchart identifying steps of a method for side-by-side display of a panoramic image and a 3-D model visualization of an aircraft in production.

FIG. 9 is a flowchart identifying steps of a method for side-by-side display of a panoramic image and a 3-D model visualization of an aircraft in production. The method 70 starts with the user selecting a particular reference aircraft and a captured panoramic photographic dataset associated with the particular reference aircraft (step 72) using a first graphical user interface displayed on a screen of a computer system. The user also selects a 3-D CAD model dataset associated a current production aircraft (step 74) using a second graphical user interface displayed on the screen of the computer system. These data sets are retrieved from a non-transitory tangible computer-readable storage medium and then loaded into the panoramic image viewer application and the 3-D CAD model visualization application, respectively (step 76). An interprocess communication connection is established between the panoramic image viewer application and the 3-D CAD model visualization application (step 78). Using the panoramic imaging graphical user interface, the user selects the desired viewpoint in the panoramic image viewer application (step 80). The viewpoint representation conversion process of the panoramic image viewer application then computes the appropriate viewpoint parameter values for the 3-D CAD model visualization application from the current virtual camera location data associated with the panoramic image being displayed by the panoramic image viewer application (step 82). The client request process of the panoramic image viewer application then encodes that current virtual camera location data into a representation (such as a formatted command data string) appropriate for the external API of the 3-D CAD model visualization application and sends the command data string to the 3-D CAD model visualization application over the interprocess communication pathway (e.g., HTTP strings sent over a TCP connection) (step 84). Upon receiving the formatted command data string, the external API of the 3-D CAD model visualization application decodes the command data string into the viewpoint representation to be used by the 3-D CAD model visualization application and the 3-D viewpoint is updated (step 86). The computer system displays the panoramic image for the reference aircraft and the 3-D CAD model visualization of the current production aircraft side by side on the same display device from the same user-selected viewpoint (step 88). A determination is then made whether additional updates are desired or not (step 90). If additional updates are desired, then the process returns to step 78. If additional updates are not desired, then the process terminates.

In accordance with one implementation, the viewpoints are sent between applications only when directly requested by the user. In accordance with alternative implementations, automatic continuous updates of the viewpoint are provided using a similar continuously updated communication process.

The panoramic imaging/3-D visualization integration described hereinabove can be used to deliver both "as-built" and "as-designed" representations and automated data updates for specific line number aircraft during aircraft assembly.

As used in the claims, the term "computer system" should be construed broadly to encompass a system having at least one computer or processor, and which may have multiple computers or processors that communicate through a network or communications bus. As used in the preceding sentence, the terms "computer" and "processor" both refer to devices comprising a processing unit (e.g., a central processing unit, an integrated circuit or an arithmetic logic unit). Examples of suitable computer systems include a smartphone, tablet computer, laptop computer, desktop computer, workstation computer, smart watch, head-mounted display or other wearable displays. The computer system may include one or more of each of a number of components such as, for example, a main processor connected to a graphics processor.

Figure 10:
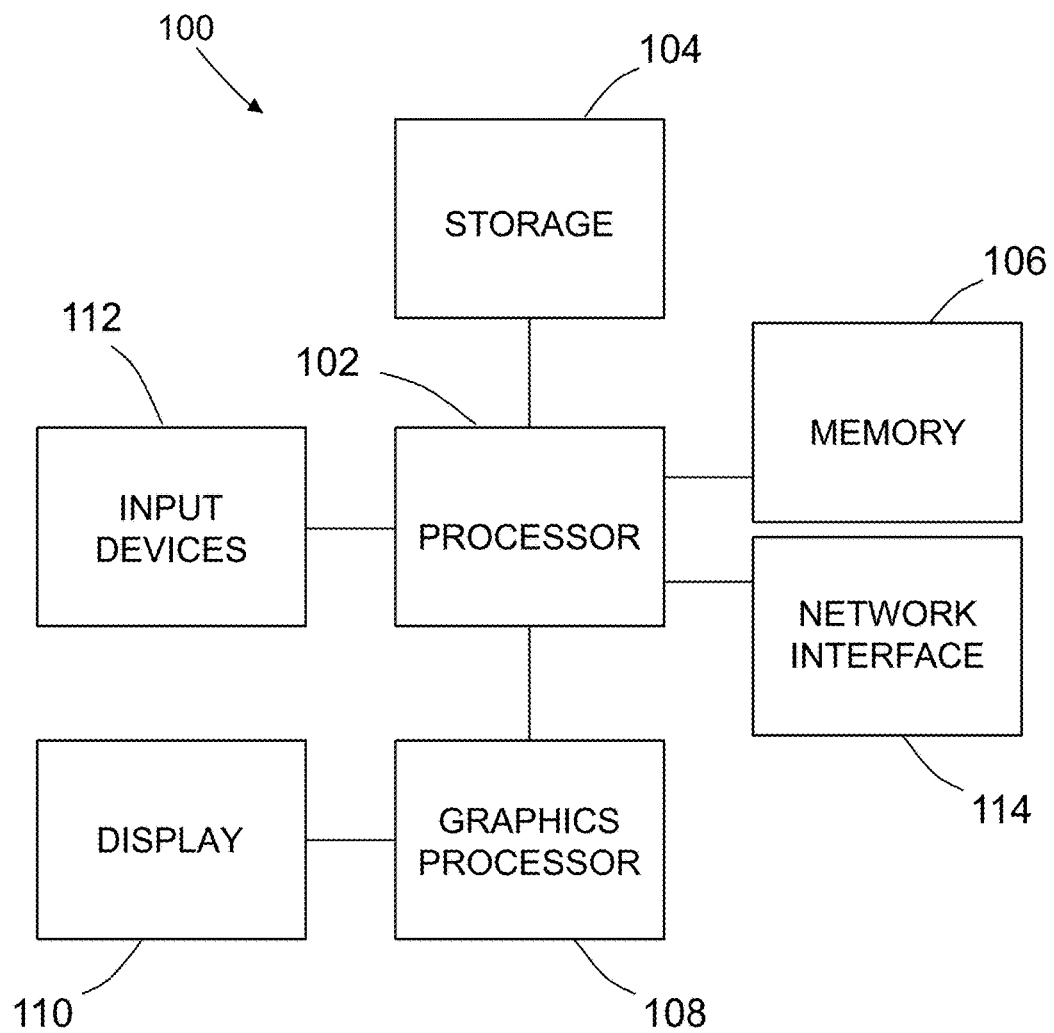
FIG. 10 is a block diagram identifying components of a computer system suitable for executing the automated data processing functions disclosed herein.

FIG. 10 is a block diagram identifying components of a system 100 suitable for executing the automated data processing functions disclosed herein. The processor 102 is generally any piece of computer hardware that is capable of executing computer programs that process data (e.g., a 3-D model visualization application). The processor 102 may comprise electronic circuits, some of which may be packaged as an integrated circuit (e.g., a chip) or multiple interconnected integrated circuits. The processor 102 may be configured to execute computer programs, which may be stored onboard the processor or otherwise stored in a memory 106 as computer-readable program code. In alternative embodiments, the processor 102 may be embodied as or otherwise include one or more application-specific integrated circuits, field-programmable gate arrays or the like.

The storage 104 is generally any piece of hardware that is capable of storing digital data and computer programs (e.g., computer-readable program code and 3-D model files) on a permanent basis. Such storage may take the form of a hard drive, a solid-state drive, a USB flash drive, an optical disk, a magnetic tape or some combination thereof.

The memory 106 is generally any piece of computer hardware that is capable of storing digital data and computer programs (e.g., computer-readable program code and a 3-D model file) on a temporary basis. The memory 106 may include volatile and non-volatile memory, and may be fixed or removable. Examples of suitable memory include random access memory, read-only memory, a hard drive, a flash memory, a thumb drive, an SD card, a removable computer diskette, an optical disk, or some combination thereof.

In various instances, the storage 104 and the memory 106 may be referred to as a tangible computer-readable storage medium. A tangible computer-readable storage medium is a non-transitory device capable of storing information, and is distinguishable from computer-readable transmission media such as electronic transitory signals capable of carrying information from one location to another.

The system 100 further comprises one or more input devices 112. The input devices 112 may be wired or wireless, and may be configured to receive information from a user into the apparatus, such as for processing, storage and/or display. Examples of suitable user input devices include a mouse, microphone, image or video capture device, keyboard or keypad, joystick, touch-sensitive surface (separate from or integrated into a touchscreen), biometric sensor or the like.

In response to the input of a 3-D visualization activation command from the user via input devices 112, the processor 102 retrieves a file containing 3-D model data from the storage 104 and stores it temporarily in the memory 106. The processor 102 selectively processes the 3-D model data stored in memory 106 in accordance with other user inputs received via the input devices 112 and in accordance with instructions read from the 3-D model visualization application software stored in memory 106.

In accordance with one implementation, the 3-D model visualization application uses a graphics programming environment (like openGL) to instruct the processor 102 to load a 3-D model from storage 104. Sometimes the 3-D model data goes into the memory 106 and then is loaded into graphics memory (not shown) which is associated with or incorporated in the graphics processor 108, and on other occasions it may go directly into the graphics memory. The graphics processor 108 and associated graphics memory may be parts of an integrated graphic processing unit.

In addition to the storage 104 and 106, the processor 102 is connected to a graphics processor 108, which is in turn connected to a display device 110. The graphics processor 108 is configured to render for display digital 3-D models of a structural product composed of a plurality of parts and with respective viewpoints in response to receipt of coordinate transformation matrices from the processor 102. More specifically, the graphics processor 108 processes the 3-D model data and outputs pixel data to a digital image or raster graphics image file for display on a display device. In the alternative, it is common for high-end systems to have a central processing unit (CPU) as well as a graphics processing unit (GPU), but some systems, like lower-end computing systems or smartphones, may have a single processor with an embedded graphics processing chip (often referred to as "integrated" graphics), or even "software" rendering, which uses the CPU to render the images.

The processor 102 may also be connected to a network interface 114 for transmitting and/or receiving information, such as to and from other apparatus(es), network(s) or the like. The network interface 114 may be configured to transmit and/or receive information by physical (wired) and/or wireless communications links. Examples of suitable communication interfaces include a network interface controller (NIC), wireless NIC or the like.

The display device 110 may be configured to present or otherwise display information to a user. Suitable examples include a liquid crystal display, light-emitting diode display, plasma display panel or the like.

While systems and methods for synchronized display of panoramic images and 3-D model visualizations have been described with reference to various embodiments, it will be understood by those skilled in the art that various changes may be made and equivalents may be substituted for elements thereof without departing from the teachings herein. In addition, many modifications may be made to adapt the concepts and reductions to practice disclosed herein to a particular situation. Accordingly, it is intended that the subject matter covered by the claims not be limited to the disclosed embodiments.

As used herein, the term "location" comprises position in a fixed 3-D coordinate system and orientation relative to that coordinate system.

The process claims set forth hereinafter should not be construed to require that the steps recited therein be performed in alphabetical order (any alphabetical ordering in the claims is used solely for the purpose of referencing previously recited steps) or in the order in which they are recited.

The invention claimed is:

1. A system for synchronized display of panoramic images and visualizations of three-dimensional models for use in assembly of aircraft, comprising:

a non-transitory tangible computer-readable storage medium storing panoramic photograph datasets representing panoramic images for a plurality of reference aircraft and three-dimensional model datasets which can be rendered to visualize three-dimensional models for a plurality of current production aircraft that each include design modifications not incorporated in at least one of the plurality of reference aircraft;

a display system comprising a multiplicity of pixels;

a user interface for converting inputs by a user into electrical signals representing selection inputs;

a panoramic image viewer application comprising a panoramic image display process, a viewpoint representation conversion process and a client request process; and a three-dimensional model visualization application comprising a three-dimensional model visualization process and a server response process, wherein:

the panoramic image display process is configured to retrieve a panoramic photograph dataset representing a panoramic image of a particular reference aircraft from the non-transitory tangible computer-readable storage medium in response to a panoramic image selection input received from the user interface and then control the display system to display a portion of the panoramic image with a user-selected viewpoint in a first window in response to a viewpoint selection input received from the user interface;

the viewpoint representation conversion process is configured to convert an internal representation of the user-selected viewpoint to a viewpoint representation having a format acceptable to the three-dimensional model visualization process;

the three-dimensional model visualization process is configured to retrieve a three-dimensional model dataset corresponding to a particular current production aircraft from the non-transitory tangible computer-readable storage medium in response to a three-dimensional model selection input received from the user interface;

the client request process is configured to construct and transmit a command data string containing encoded data specifying parameter values of the viewpoint representation formatted for three-dimensional model visualization;

the server response process is configured to receive and decode the command data string into specified parameter values of a viewpoint for three-dimensional model visualization; and the three-dimensional model visualization process is further configured to control the display system to display a portion of a three-dimensional model visualization represented by the retrieved three-dimensional model dataset in a second window with the viewpoint specified in the command data string in response to receipt of the specified parameter values from the server response process.

2. The system as recited in claim 1, wherein:

the client request process is further configured to request an update status value from the server response process and then respond when it receives a signal indicating that the three-dimensional model visualization viewpoint has changed by requesting that a representation of a current three-dimensional model visualization be sent by the server response process;

the viewpoint representation conversion process is further configured to convert the representation of the current three-dimensional model visualization received from the server response process to a viewpoint representation having specified parameter values in a format acceptable to the panoramic image display process; and the panoramic image display process is further configured to control the display system to display a portion of a panoramic image in the first window with a viewpoint corresponding to the current three-dimensional model visualization viewpoint in response to receipt of the specified parameter values from the viewpoint representation conversion process.

3. The system as recited in claim 1, wherein the panoramic image in the first window and the three-dimensional model visualization in the second window are used during assembly of the particular current production aircraft.

4. The system as recited in claim 1, wherein the multiplicity of pixels are arranged to form a display screen, and the first and second windows appear side by side on the display screen.

5. The system as recited in claim 1, wherein the multiplicity of pixels are arranged to form first and second display screens, and the first and second windows appear on the first and second display screens respectively.

6. The system as recited in claim 1, wherein the data representing the viewpoint contained in the command data string comprises coordinates of a look-from position and coordinates of a look-at point.

7. The system as recited in claim 6, wherein the data representing the viewpoint contained in the command data string further comprises an angle value describing the field-of-view.

8. The system as recited in claim 1, wherein the three-dimensional model visualization in the second window shows an aircraft modification not shown in the panoramic image in the first window.

9. The system as recited in claim 1, wherein the command data string is formatted in accordance with hypertext transfer protocol.

10. A method for synchronized display of panoramic images and three-dimensional model visualizations for use in assembly of aircraft, comprising:
    selecting a particular reference aircraft;
    retrieving a panoramic photograph dataset for the selected reference aircraft;
    displaying at least a portion of a panoramic image represented by the panoramic photograph dataset for the selected reference aircraft;
    selecting a particular current production aircraft having a design modification not incorporated in the selected reference aircraft;
    retrieving a three-dimensional model dataset for the selected current production aircraft;
    displaying a first viewpoint of a visualization of a three-dimensional model for the selected current production aircraft;
    selecting a viewpoint for the panoramic image, the selected viewpoint comprising first viewpoint parameter values;
    displaying at least a portion of the panoramic image represented by the panoramic photograph dataset for the selected reference aircraft with the selected viewpoint;
    computing a second viewpoint for a visualization of the three-dimensional model based on the selected viewpoint for the panoramic image, the second viewpoint comprising second viewpoint parameter values which are different than the first viewpoint parameter values; and
    displaying the second viewpoint for a visualization of the three-dimensional model for the selected current production aircraft,
    wherein the selected viewpoint and the second viewpoint are the same, and
    wherein the design modification is displayed for use in assembly of the current production aircraft.

11. The method as recited in claim 10, further comprising:
    constructing a command data string containing encoded data specifying the viewpoint parameter values in the second format;
    transmitting the command data string to a three-dimensional visualization application; and
    decoding the received command data string into specified parameter values of the computed viewpoint.

12. The method as recited in claim 11, wherein the data representing the viewpoint contained in the command data string comprises coordinates of a look-from position and a look direction vector.

13. The method as recited in claim 11, wherein the data representing the viewpoint contained in the command data string further comprises an angle value describing the field-of-view.

14. The method as recited in claim 11, wherein the command data string is formatted in accordance with hypertext transfer protocol.

15. The method as recited in claim 11, wherein the command data string is transmitted via a transmission control protocol connection to an external application programming interface defined in the three-dimensional model visualization application.

16. A method for synchronized display of panoramic images and three-dimensional model visualizations for use in assembly of aircraft, comprising:
    retrieving a panoramic photograph dataset representing a panoramic image of a particular reference aircraft from a non-transitory tangible computer-readable storage medium in response to a panoramic image selection input received from a user interface;
    displaying a portion of the panoramic image with a user-selected viewpoint in response to a viewpoint selection input received from the user interface;
    converting an internal representation of the user-selected viewpoint to a viewpoint representation having a format acceptable to a three-dimensional model visualization process of a three-dimensional model visualization application;
    retrieving a three-dimensional model dataset corresponding to a particular current production aircraft from the non-transitory tangible computer-readable storage medium in response to a three-dimensional model selection input received from the user interface;
    constructing a command data string containing encoded data specifying parameter values of the viewpoint representation formatted for three-dimensional model visualization;
    transmitting the command data string to the three-dimensional model visualization application;
    decoding the transmitted command data string into specified parameter values of a viewpoint for three-dimensional model visualization; and
    displaying a portion of a three-dimensional model visualization represented by the retrieved three-dimensional model dataset in a second window with the viewpoint specified in the command data string in response to receipt of the specified parameter values.

17. The method as recited in claim 16, wherein the data representing the viewpoint contained in the command data string comprises coordinates of a look-from position and a look direction vector, and an angle value characterizing a field-of-view.

18. The method as recited in claim 16, wherein the command data string is transmitted via a transmission control protocol connection to an external application programming interface defined in the three-dimensional model visualization application.

19. The method as recited in claim 16, wherein the first and second windows appear side by side on a display screen.

20. The method as recited in claim 16 wherein the three-dimensional model visualization in the second window shows an aircraft modification not shown in the panoramic image in the first window.

21. A system comprising a display system, one or more processors, a user interface for converting inputs by a user into electrical signals representing selection inputs, and a non-transitory tangible computer-readable storage medium containing first executable code for executing a panoramic image viewer application, second executable code for executing a three-dimensional visualization application, stored panoramic photograph datasets representing panoramic images of an object, and stored three-dimensional model datasets representing three-dimensional models of the object but with a design modification, wherein the one or more processors are configured to be capable of performing the following operations:

retrieving a panoramic photograph dataset representing a panoramic image of a particular reference aircraft from the non-transitory tangible computer-readable storage medium in response to a panoramic image selection input received from the user interface;

controlling the display system to display a portion of the panoramic image with a user-selected viewpoint in response to a viewpoint selection input received from the user interface;

converting an internal representation of the user-selected viewpoint to a viewpoint representation having a format acceptable to the three-dimensional model visualization application;

retrieving a three-dimensional model dataset corresponding to a particular current production aircraft from the non-transitory tangible computer-readable storage medium in response to a three-dimensional model selection input received from the user interface;

constructing a command data string containing encoded data specifying parameter values of the viewpoint representation formatted for three-dimensional model visualization;

transmitting the command data string from the panoramic image viewer application to the three-dimensional model visualization application;

decoding the transmitted command data string into specified parameter values of a viewpoint for three-dimensional model visualization; and controlling the display system to display a portion of a three-dimensional model visualization represented by the retrieved three-dimensional model dataset in a second window with the viewpoint specified in the command data string in response to receipt of the specified parameter values.

* * * * *